United States Patent
Sharp

[15] 3,703,021
[45] Nov. 21, 1972

[54] POULTRY PROCESSING METHOD AND APPARATUS

[72] Inventor: Allen W. Sharp, 1540 North Van Buren Street, Ottumwa, Iowa 52501

[22] Filed: Dec. 28, 1970

[21] Appl. No.: 101,907

[52] U.S. Cl..................................17/47, 17/11.1
[51] Int. Cl.................................A22c 21/02
[58] Field of Search...........17/11.2, 11.1, 15, 51, 47, 17/11

[56] References Cited

UNITED STATES PATENTS

| | | |
|---|---|---|
| 3,320,632 | 5/1967 | Oehring.....................17/51 |
| 1,848,596 | 3/1932 | Allbright....................17/15 |
| 3,074,103 | 1/1933 | Roth et al...................17/47 |
| 3,343,477 | 9/1967 | Ekstam....................17/15 X |

Primary Examiner—Lucie H. Laudenslager
Attorney—Molinare, Allegretti, Newitt & Witcoff

[57] ABSTRACT

Method and apparatus for scalding fowls in a sanitary manner so that scald water utilized in the scalding of the body of one fowl is not reused in the scalding of the bodies of other fowls.

6 Claims, 5 Drawing Figures

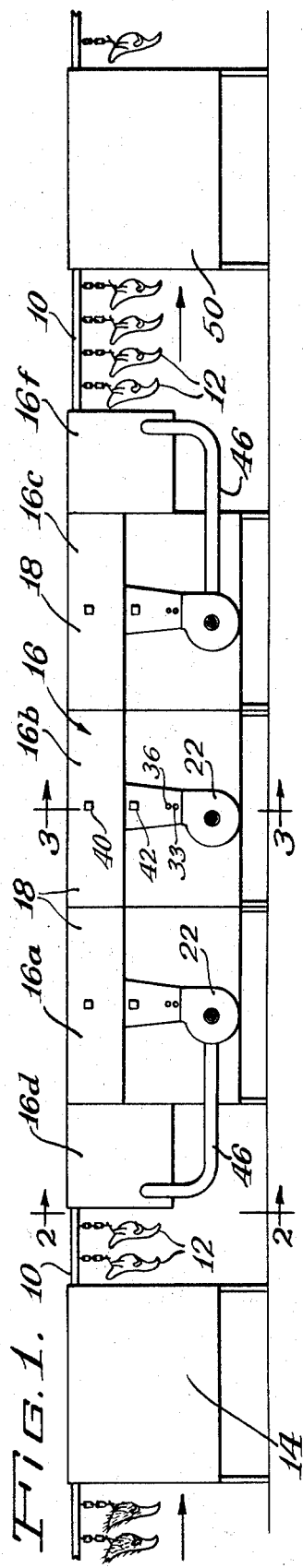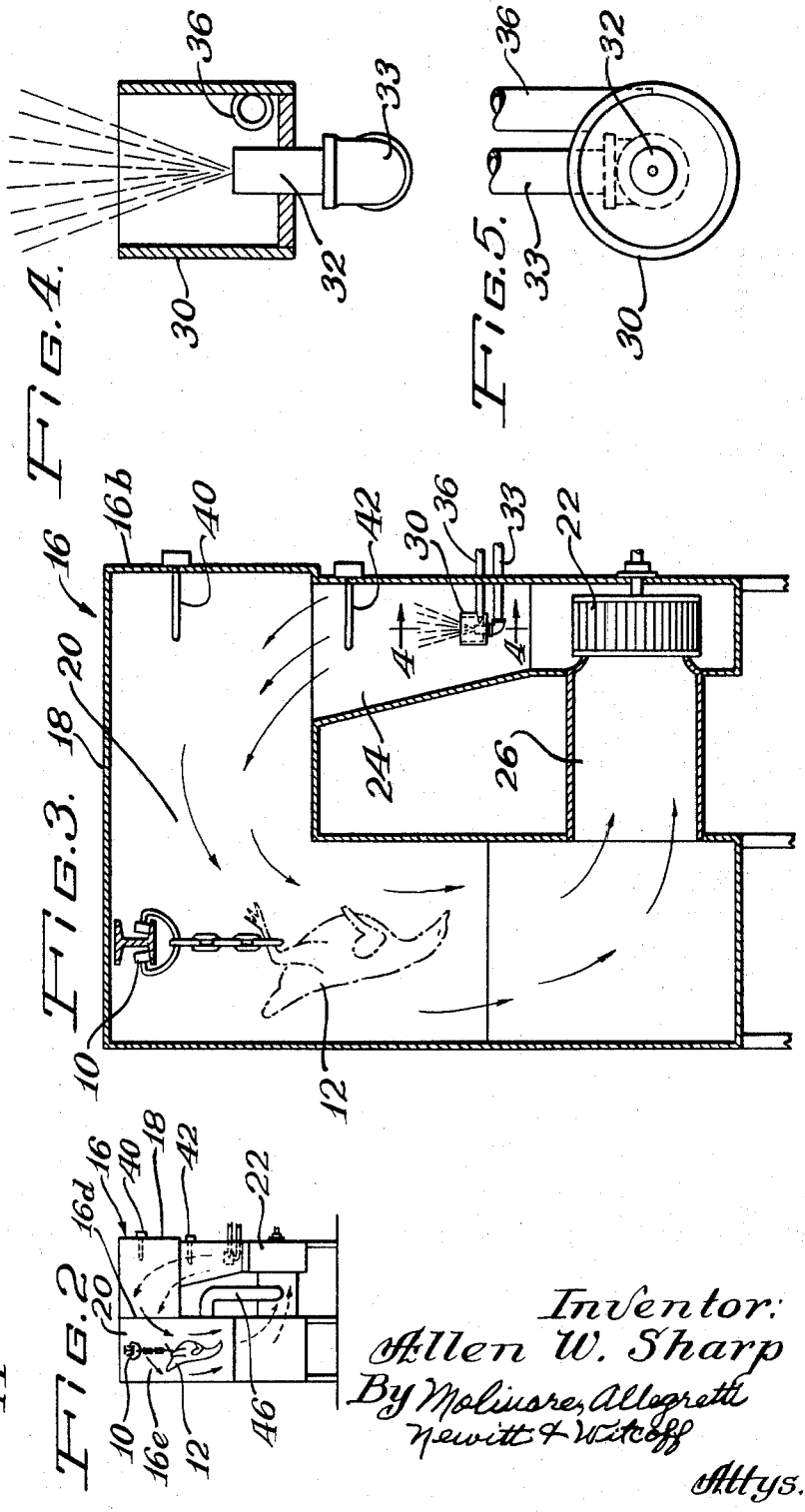

3,703,021

POULTRY PROCESSING METHOD AND APPARATUS

BACKGROUND OF THE INVENTION

This invention relates to a novel method and apparatus for processing fowls, after killing, preparatory to performing eviscerating operations upon the fowls.

Commercial processors of fowls now utilize mechanical equipment for continuously moving the fowls through the steps of killing, scalding, picking and eviscerating operations. The commonly used method and apparatus for scalding fowls consists of total immersion of the bodies of the fowls in tanks of hot water, maintained at desirable temperature ranges, depending on the character and nature of the fowls being processed, for the purposes of conditioning the skin of the bodies of the fowls, and for facilitating removal of the feathers from the bodies of the fowls. Scalding by the immersion process has long been condemned by Government inspection services because of the contamination of the fowls by the filth and bacteria of fowls previously immersed in the scald tank. In addition to the contamination of fowls by filth and bacteria present in the scald water from previously processed fowls, it sometimes happens that when the fowls move into the scald tank, if they have not completely stopped breathing, there is the likelihood that the contaminated scald water may be drawn up into the lungs or other part of the circulatory system of the fowl and render the same unfit for consumption.

Such immersion scald operations are permitted to continue to be used, notwithstanding the unsanitary conditions, solely because of the lack of availability of suitable methods and apparatus by virtue of which fowls may be scalded in a sanitary manner. There have been numerous attempts heretofore made to provide methods and apparatus for the scalding of fowls in a sanitary manner for commercial processing. For example, the Barker, et al. U.S. Pat. No. 2,813,298, dated Nov. 19, 1957, is directed to a method of processing fowl by batches, that is relatively small numbers at a time, which effects a substantial reduction in extent of contamination of fowls by filth and bacteria on the bodies of other fowls. The Amstad U.S. Pat. No. 3,138,822, dated June 30, 1964, is directed to a method and apparatus by virtue of which fowls may be subjected to a scald operation while they are individually suspended on an overhead conveyor and by virtue of which the scalding operation would appear to be capable of accomplishment in a sanitary manner. In the process and apparatus disclosed in this latter patent the fowls, after killing, pass through a chamber, while being moved by an overhead conveyor, where they are subjected to high velocity sprays of hot water and also to circulated heated air containing moisture.

The present invention is directed to a method and apparatus which is relatively simple and inexpensive and by virtue of which the fowls, while individually suspended from an overhead conveyor, may be scalded in a novel, sanitary manner.

One of the objects of this invention is to provide a novel method and apparatus for processing fowls in a manner to insure sanitary and efficient scalding operations to be performed upon the bodies of the fowls on a mass production basis, and which insures substantially elimination of all contamination of the body of a fowl by preceding fowls processed by an automated processing system.

Another object of this invention is to provide a novel method and apparatus for processing fowls wherein the fowls, after killing, are first subjected to a preliminary picking operation for the removal of the major portion of the feathers from the bodies of the fowls, after which the bodies of the fowls are subjected to a scalding action, and then to a final picking action to effect the removal of the remaining feathers from the bodies of the fowls.

A further object is to provide a novel method and apparatus for processing fowls which permits the performance of an efficient, controlled, sanitary scald operation upon the bodies of the fowls by subjecting the fowls, while being individually suspended on an overhead conveyor, to a fluid mixture of steam and water, and wherein the quantity of water is in excess of that necessary to maintain the admixture at substantially 100 percent humidity, whereby portions of said excess water are caused to be deposited directly upon the bodies of the fowls for performing a scalding operation thereon.

Still another object is to provide a novel method and apparatus of the character indicated, which effects a substantial reduction in the amount of heat necessary for performing the scald operation upon the fowls and thus effecting substantial economies to the processor.

A still further object of this invention is to provide a novel method and apparatus of the character indicated, which permits utilization of the novel scald apparatus in conjunction with existing, conventional picking machines, which results in substantial savings to existing processors desiring to utilize the novel scalding method and apparatus of the present invention.

It is also an object of this invention to provide a novel method and apparatus of the character indicated, which effects a substantial reduction in the amount of floor space necessary for the performing of scalding and picking operations upon the fowls.

BRIEF DESCRIPTION OF THE DRAWINGS

FIG. 1 is a diagrammatic view, in side elevation, of the apparatus embodying the present invention;

FIG. 2 is an end elevational view of the scalding apparatus, taken substantially as indicated at line 2—2 on FIG. 1;

FIG. 3 is an enlarged transverse sectional view through the scalding apparatus, taken substantially as indicated at line 3—3 on FIG. 1;

FIG. 4 is an enlarged sectional view of the humidifier for creating an atomized admixture of water and steam, taken substantially as indicated at line 4—4 on FIG. 3;

FIG. 5 is a top view of the humidifier shown in FIG. 4.

DESCRIPTION OF THE PREFERRED EMBODIMENT

The method and the apparatus embodying the present invention are utilized in connection with a conventional, overhead conveyor 10, from which fowls indicated at 12 are suspended by their feet in a customary manner. The fowls, after killing and bleeding, are moved along the overhead conveyor into a machine indicated at 14, for performing a preliminary picking operation upon the bodies of the fowls, preferably by the use of unheated water. The picking machine may be of any of the conventionally used types. During this preliminary picking operation, the majority of the feathers on the bodies of the fowls are totally removed and when the fowls move out of the preliminary picking machine, their bodies are substantially bald. The fowls then move immediately into the novel scalding apparatus indicated generally at 16. As shown, the scalding apparatus is made up of three interconnected units, 16a, 16b and 16c, each including a cabinet or casing 18, formed to provide a continuous chamber 20 through all of the units. The casings enclose a portion of the overhead conveyor, and the suspended fowls 12 are continuously moved through the chamber 20 of the scalding apparatus.

Each unit of the scalder apparatus, depending upon its length, is provided with its own centrifical blower 22 for discharging fluid in an upwardly direction through the duct portion 24 into the chamber 20 of casings of the units to circulate the fluid around and over the bodies of the fowls suspended on the overhead conveyor. The fluid in the system is continuously recirculated and for this purpose I provide a return duct 26 to continuously withdraw fluid from the lower portion of the chamber 20, into the centrifical blower. Interposed in the upwardly open duct 24 of each unit is a humidifier spray assembly, which includes an upwardly open cup-shaped body 30, in the bottom wall of which is mounted an atomizer nozzle 32, connected to pipe 33 a source of water supply. The nozzle 32 is preferably designed for the creation of an atomized spray of water in cone-shaped formation, and of a cross-sectional dimension to preclude impingement upon the side wall of the upwardly open cup-shaped body. Opening to the interior of the cup-shaped body is a steam supply conduit 36, which discharges steam tangentially to the inner wall of the cup-shaped body and by virtue of which the steam surrounds and admixes with the spray of water, and heats the water to the desired temperature. It is to be understood that the fluid admixture shall be such as to completely saturate the air and provide an excess quantity of water for entrainment in the air. This excess water, over and above the 100 percent humidity of the air, is entrained in the fluid by the stream eminating from the blower 22 at a velocity sufficient to cause the fluid admixture to rapidly circulate through the chamber 20, into contact with the bodies of the fowls moving therethrough, which results in depositing portions of said excess water of the admixture directly upon the bodies of the fowls (which at this time have the major portion of their feathers removed) for quickly and efficiently performing a conditioning and scalding operation upon the bodies of the fowls.

Suitable controls are preferably associated with each unit of the scalding section, such as a thermometer 40 extending into the upper portion of the chamber 20, and a temperature controller device 42, of conventional type, for automatic controlling of the valves supplying steam and water to the humidifier so as to obtain and maintain precise temperature and humidity and excess moisture conditions within the casing 20.

As is well-known, the temperatures at which fowls are scalded vary substantially, depending upon the size, age and character of the fowls being processed. For example, in scalding chickens the temperature of the scald liquid is preferably in the range of 126° 14 134°F. As to the number of units or sections, or the length of the scalding apparatus to be utilized, will depend upon the speed of travel of the overhead conveyor, as well as upon the size and character of the fowls being processed. For example, in scalding of turkeys or chickens of one year of age or more, the scalding temperature would be preferably in the range of 138°–140° F., and the scald operation may, if desired, be of longer duration than for fryers or broilers.

The fluid utilized in the scalding process and apparatus preferably should be accurately controlled and maintained at 100 percent humidity plus an excess quantity of moisture, which excess will serve to preclude evaporation, and make it possible to maintain closely controlled, accurate temperatures within the scalding chamber. It might be said that the excess of water in the fluid admixture of steam and water, over and above 100 percent humidity, is in the nature of a "light rain" or "mist" in that it will be present in relatively fine atomized form for deposit upon the fowls, and which will effect an efficient scalding operation upon the bodies of the fowls.

The scalding casing unit 16a, at the inlet end, is formed with an extension 16d, providing an extension of chamber 20 and having a generally rectangular entrance opening 16e, as seen in FIG. 2, to accommodate the overhead conveyor and the passage of the suspended fowl bodies into the scalding chamber. At the outer end of the last unit 16c of the scalder apparatus through which the fowls pass, there is an extension 16f corresponding oppositely and identically to the extension 16d at the inlet end, and having an exit opening similar to opening 16e, through which the fowls move out of the scalder apparatus.

In each of the extensions 16d and 16f, at the inlet and outlet ends respectively, there is provided a suitable duct 46, opening at one end to the interior of said extensions, and the opposite end being connected into the casing of the adjacent respective blower 22. By virtue of this arrangement, fluid within the scalding chamber is continuously withdrawn immediately adjacent the respective inlet and outlet openings, and recirculated throughout the chamber of the scald apparatus. This arrangement in effect provides the equivalent of an air curtain, constituting a substantial closure for the inlet and outlet openings, and reducing to a minimum the introduction of outside air into the circulating fluid system of the scalding apparatus. If desired, the respective inlet and outlet openings of the scalding chamber may be provided with flexible flaps of any suitable material, which will serve to provide a degree of closing off of the inlet and outlet openings, while permitting the passage of the bodies of the fowls therethrough.

After the fowls have been scalded they are moved by the overhead conveyor into one or more conventional picking machines 50, for the removal of the balance of the feathers from the bodies of the fowls, thereby completing the removal of all feathers from the fowls, preparatory to performing eviscerating operations thereon.

While I have illustrated in the diagrammatic view of FIG. 1, separate spaced apart cabinet or casing structures for performing the picking and scalding operations, if desired, the cabinet structures could be interconnected so that the fowls are caused to move through a tunnel-like enclosure throughout the picking and scalding operations, and in which case the side walls of the cabinets or casings would be provided with suitable doors for ready access to and examination of the fowls during processing, or for cleaning, adjusting and repairing the apparatus. I prefer that the cabinet units, namely picking and scalding apparatus, be separated short distances so that the condition of the picking and scalding operations being performed upon the fowls can be readily observed, and so that access for cleaning, adjustment and repair of the separate apparatus may be conveniently attended to or made.

It will be apparent that performing a preliminary picking operation upon the fowls, prior to scalding, is of substantial importance because by the removal of the major portion of the feathers from the bodies of the fowls, prior to scalding, the scalding operation when performed can be more accurately and efficiently controlled and performed. In performing the scalding method by the use of fluid of 100 percent humidity, and of a desired temperature, together with an excess amount of water entrained therein in the form of a "light rain" or "mist", which is blown against and collects upon the bodies of the fowls, an efficient, sanitary scalding operation is attained. The excess moisture over and above 100 percent humidity, carried in the circulating fluid within the chamber, is primarily to control the temperature of the excess moisture by preventing evaporation, which makes it possible to obtain relatively fine or accurate and constant temperature control within one-fourth of a degree. Such control is highly important for efficiency, and because the temperature of the scald is critical.

By the use of moisture in excess of 100 percent humidity in the circulating fluid medium, there must be enough water in the fluid medium to give up its heat and quickly drain off from the bodies of the fowl. The amount of water and steam utilized in the fluid medium would be substantially less than that used in conventional scalders, which are currently in extensive use today, wherein Government inspection services require the addition of ½ gallon of hot water as make-up and overflow water per fowl. Hence, my novel method and apparatus will result in substantial savings, both in the quantity of water and the amount of heat required in performing of the scalding operation.

While the novel method and apparatus for performing the scald operation will perform an effective and efficient scalding action, if desired additional spray nozzles may be utilized for projecting sprays of scald water, of desired temperature, directly upon the bodies of the fowls.

It will be recognized that with the novel method and apparatus for scalding, it requires a matter of a few minutes to place the system into operation as compared to the requirement of an hour or more for set-up scalding operations by the use of an immersion system.

Most present day processing conveyor lines run 3,000 to 6,000 fowl per hour, at 6 inch spacing, with the speed of the conveyor being in the range of 50 to 100 feet per minute. Since the fowls will be substantially bald when entering the scalder, the time for performing the scalding operation should not take more than from 30 to 40 seconds to complete. To accomplish scalding in this short period of time would require a scalder of a short length of 25 to 65 feet, depending upon the speed of travel of the overhead conveyor moving the bodies of the fowls through the scalder, and the nature of the fowls to be processed.

It is believed that finish picking of the fowls will probably be accomplished in a shorter period of time due to having the main portion of the feathers removed from the bodies of the fowls during preliminary picking prior to scalding, and further due to the performance of a more uniform scald upon the bodies of the fowls by the novel scald method and apparatus.

What is claimed is:

1. The method of processing fowls, after killing, preparatory to performing eviscerating operations thereon, comprising the step of subjecting the fowls to a preliminary picking operation for removing the major portions of the feathers from the bodies of the fowls, after said preliminary picking the step of subjecting the fowls to a scalding operation for loosening the remainder of the feathers on the bodies of the fowls and the step of subjecting the fowls to a final picking operation for removal of the remainder of the feathers from the bodies of the fowls.

2. The method defined in claim 1, wherein the step of scalding is characterized as including the subjection of the bodies of the fowls to an admixture of steam and water with the quantity of water being sufficient to provide substantially 100 percent humidity of the admixture.

3. The method defined in claim 1, wherein the step of scalding is characterized as including the subjection of the bodies of the fowls to an admixture of steam and water wherein the quantity of water in the admixture is in excess of that necessary to maintain the admixture at substantially 100 percent humidity.

4. The method defined in claim 3, wherein the admixture is caused to move into direct contact with the bodies of the fowls for depositing thereon a portion of said excess quantity of water.

5. The method defined in claim 1, wherein the step of preliminary picking of the fowls is performed with the use of unheated water.

6. The method defined in claim 1, wherein each of the steps are sequentially performed while the fowls are being supported, and moved along on overhead conveyors.

* * * * *

Disclaimer 3,703,021.—*Allen W. Sharp*, Ottumwa, Iowa. POULTRY PROCESSING METHOD AND APPARATUS. Patent dated Nov. 21, 1972. Disclaimer filed Feb. 12, 1975, by the inventor.

Hereby enters this disclaimer to claims 1, 2, 3, 4 and 6 of said patent.

[*Official Gazette May 20, 1975.*]